United States Patent
Bry et al.

(10) Patent No.: US 12,049,289 B2
(45) Date of Patent: Jul. 30, 2024

(54) METHOD AND DEVICE FOR DETERMINING THE DIRECTION AND THE AMPLITUDE OF A FORCE APPLIED TO A PROPULSION NACELLE FOR A BOAT

(71) Applicant: AETC SAPPHIRE, Saint Petersburg (RU)

(72) Inventors: Jean-Jacques Bry, Champigneulles (FR); Loic Vincent, Belfort (FR); Lionel Julliand, Belfort (FR); Pierre Humbert, Champigneulles (FR); Jan Hemmelmann, Garching Bei Munchen (DE)

(73) Assignee: AETC SAPPHIRE, Saint Petersburg (RU)

( * ) Notice: Subject to any disclaimer, the term of this patent is extended or adjusted under 35 U.S.C. 154(b) by 0 days.

(21) Appl. No.: 16/630,418

(22) PCT Filed: Jul. 10, 2018

(86) PCT No.: PCT/EP2018/068689
§ 371 (c)(1),
(2) Date: Jan. 10, 2020

(87) PCT Pub. No.: WO2019/011927
PCT Pub. Date: Jan. 17, 2019

(65) Prior Publication Data
US 2021/0114699 A1   Apr. 22, 2021

(30) Foreign Application Priority Data

Jul. 11, 2017 (EP) .................................. 17305905

(51) Int. Cl.
*B63B 79/10* (2020.01)
*B63H 5/125* (2006.01)
(Continued)

(52) U.S. Cl.
CPC ............. *B63B 79/10* (2020.01); *B63H 5/125* (2013.01); *G01B 11/16* (2013.01); *G01B 17/04* (2013.01);
(Continued)

(58) Field of Classification Search
CPC ......... B63B 79/10; G01B 11/16; G01B 17/04; B63H 5/125; B63H 5/1252; B63H 2005/1258; G01L 5/12
(Continued)

(56) References Cited

U.S. PATENT DOCUMENTS

| | | | | |
|---|---|---|---|---|
| 2,562,195 A | * | 7/1951 | Lee .......................... | F16F 13/24 267/140.13 |
| 4,464,935 A | * | 8/1984 | McHugh ................ | G01H 1/003 73/462 |

(Continued)

FOREIGN PATENT DOCUMENTS

| | | | | |
|---|---|---|---|---|
| CA | 2313927 A1 | * | 1/2001 | ............... B23B 5/02 |
| CA | 3026941 A1 | * | 6/2019 | ............. B63G 13/02 |

(Continued)

OTHER PUBLICATIONS

Translation RU-2214345-C1 (Year: 2003).*
(Continued)

*Primary Examiner* — Peter J Macchiarolo
*Assistant Examiner* — Monica S Young
(74) *Attorney, Agent, or Firm* — WOOD IP LLC

(57) ABSTRACT

The invention relates to a method for determining the direction and the amplitude of a force applied to a system (IO) comprising a stationary portion (13) and a mobile portion (12) which can deform when exposed to said force. Mechanical deformations applied to the mobile portion when exposed to said force are measured by measuring a distance between the stationary portion and the mobile (Continued)

Figure 1:
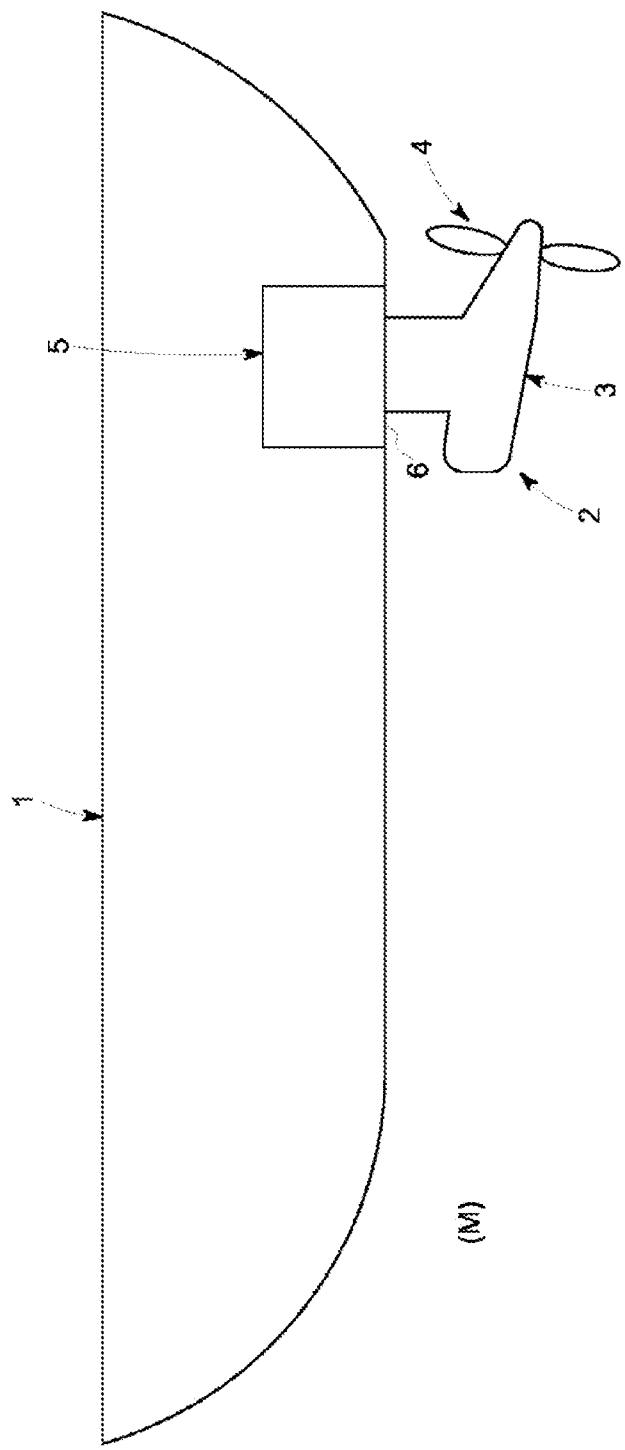

portion in the direction of application of the force, and the distance measurements are processed in order to determine the amplitude and the direction of the force.

20 Claims, 7 Drawing Sheets

(51) Int. Cl.
*G01B 11/16* (2006.01)
*G01B 17/04* (2006.01)
*G01L 5/12* (2006.01)

(52) U.S. Cl.
CPC .... *B63H 5/1252* (2013.01); *B63H 2005/1258* (2013.01); *G01L 5/12* (2013.01)

(58) Field of Classification Search
USPC .................................................. 73/862.381
See application file for complete search history.

(56) References Cited

U.S. PATENT DOCUMENTS

| 4,611,549 | A | * | 9/1986 | Kodera | B63H 25/42 |
| | | | | | 114/144 E |
| 4,791,588 | A | * | 12/1988 | Onda | G05B 19/423 |
| | | | | | 700/260 |
| 5,509,310 | A | * | 4/1996 | El-Ibiary | F16C 17/02 |
| | | | | | 73/660 |
| 2006/0070435 | A1 | * | 4/2006 | LeMieux | G05B 23/0221 |
| | | | | | 73/168 |
| 2013/0207974 | A1 | * | 8/2013 | Slemp | G01M 13/045 |
| | | | | | 345/420 |
| 2016/0297102 | A1 | * | 10/2016 | Okada | F16C 19/522 |
| 2016/0356657 | A1 | * | 12/2016 | Stansloski | G01L 1/18 |
| 2016/0377510 | A1 | * | 12/2016 | Stanley | G01H 1/006 |
| | | | | | 702/35 |
| 2017/0328804 | A1 | * | 11/2017 | Eberle | G01M 1/18 |
| 2017/0343435 | A1 | * | 11/2017 | Marrazzo | G01B 7/31 |
| 2019/0195733 | A1 | * | 6/2019 | Stansloski | G01M 1/22 |
| 2019/0204182 | A1 | * | 7/2019 | Yamashita | F16C 19/522 |

FOREIGN PATENT DOCUMENTS

| CN | 101044381 | A | | 9/2007 | |
| CN | 101213100 | A | | 7/2008 | |
| CN | 103502785 | A | * | 1/2014 | ........... F16C 19/522 |
| CN | 105466611 | A | | 4/2016 | |
| DE | 102008024540 | A1 | * | 12/2009 | ........... B63H 20/16 |
| EP | 3085508 | A1 | | 10/2016 | |
| EP | 3961177 | A1 | * | 3/2022 | ........... B64C 27/06 |
| FR | 2849694 | A1 | * | 7/2004 | ........... G01B 11/16 |
| JP | 2017150899 | A | * | 8/2017 | |
| RU | 2214345 | C1 | * | 10/2003 | ........... B63H 20/36 |
| RU | 47322 | U1 | | 8/2005 | |
| RU | 2482012 | C2 | | 5/2013 | |
| RU | 2622168 | C2 | | 6/2017 | |
| WO | WO-2015093351 | A1 | * | 6/2015 | ........ B01F 15/00201 |
| WO | 2016/091597 | A1 | | 6/2016 | |
| WO | 2016/198731 | A1 | | 12/2016 | |
| WO | WO-2016198731 | A1 | * | 12/2016 | ............... G01L 5/12 |
| WO | 2019/011927 | A1 | | 1/2019 | |

OTHER PUBLICATIONS

A Calculation Method and Data for the Dynamic Coefficients of Oil-Lubricated Journal Bearings Abstract J. W. Lund and K. K. Thomsen Department of Machine Elements The Technical University of Denmark Lyngby, Denmark 1982. Dyrobes Rotordynamics Software http://dyrobes.com; "Lund") (Year: 1982).*
Translation JP-2017150899 (Year: 2017).*
International Search Report from International Appl. No. PCT/EP2018/068689, mailed Jul. 25, 2018.

* cited by examiner

METHOD AND DEVICE FOR DETERMINING THE DIRECTION AND THE AMPLITUDE OF A FORCE APPLIED TO A PROPULSION NACELLE FOR A BOAT

The present invention relates to a method and device for determining the direction and amplitude of a force applied to a mechanical structure, notably a propulsion nacelle for a boat, also referred to as propulsion oriented drive or POD.

In this description, "boat" shall mean any type of motorized floating vessel or vehicle designed to be sailed.

A boat can be fitted with one or more partially submerged propulsion nacelles arranged partially inside the hull of the boat.

FIG. 1 shows a boat hull 1 including a boat propulsion nacelle 2 submerged in the water, for example the sea (M).

The propulsion nacelle 2 includes a submerged moveable housing 3, a propeller 4 linked to the moveable housing 3 via a rotary shaft and an orientation device 5 placed in the hull of the boat.

The moveable housing 3 contains an engine to drive the propeller 4. The moveable housing 3 is linked to the orientation device 5 via a pivoting link 6. The device 5 includes a drive device designed to orient the moveable housing 3, thereby changing the propulsion direction of the propeller 4.

The moveable housing 3 is submerged and is therefore subject to stresses resulting notably from impacts with floating solid bodies, such as icebergs in the case of an ice-breaker.

An estimate of the damage caused is required to schedule maintenance operations and to inform the captain of the boat of the state of the propulsion nacelle. In other words, the characteristics of the impacts received need to be estimated. For this reason, the direction and amplitude of each impact need to be known.

In order to determine the damage caused to a propulsion nacelle during use, one solution involves fitting the moveable housing of the propulsion nacelle with stress sensors.

However, for the measurements taken by the stress sensors to be precise, the stress sensors have to cover the entire surface of the moveable housing. Furthermore, each sensor has to be calibrated as a function of position on the moveable housing.

A large number of stress sensors is therefore required, and such sensors are complicated to install. Each sensor has to be fastened to the housing and calibrated.

In consideration of the foregoing, it is proposed to overcome the drawbacks related to determining the characteristics of the impacts suffered by the propulsion nacelle using stress sensors arranged over the entire surface of the moveable housing.

A method for determining the direction and amplitude of a force applied to a system including a static portion and a movable portion deformable under the effect of said force is therefore proposed, according to one aspect.

According to one embodiment, the mechanical deformations being applied to the movable portion under the effect of said force are measured by measuring a distance between the static portion and the movable portion in the direction of application of the force, and the distance measurements are processed to determine the amplitude and direction of the force.

According to another embodiment, the direction of the force is determined from the position of at least one measurement sensor delivering an extreme measurement value in relation to the measurement values supplied respectively by a set of angularly distributed measurement sensors measuring the movement of the movable portion in relation to the static portion.

Advantageously, the amplitude of the force is determined from a set of distance measurements predetermined as a function of force values.

Preferably, the distance measurements vary linearly as a function of the force values.

According to another embodiment, the method includes a calculation step using a finite element method.

Preferably, the method includes a force measurement and movement step carried out on a test bench.

According to another aspect, a device for determining the direction and amplitude of a force applied to a system including a static portion and a movable portion deformable under the effect of said force is proposed.

According to one embodiment, the device includes means for measuring the mechanical deformations of the movable portion, including means for measuring the distance between the movable portion and the static portion, in the application direction of the force and processing means able to determine the amplitude and direction of the force using the measurements delivered by the measurement means.

Advantageously, the measurement means include a set of measurement sensors distributed angularly about the movable portion.

Preferably, the measurement sensors are mounted on a cylindrical portion of the moveable and static portions.

According to another embodiment, the processing means are designed to determine the direction of the force from the position of at least one sensor delivering an extreme measurement value in relation to the values supplied by the other sensors.

Advantageously, the processing means include memory means designed to store a set of distance measurement values predetermined as a function of force values, the processing means being designed to determine the amplitude of the force using the measurements delivered by the sensors.

Preferably, the memory means only save the direction and amplitude values of a force if the amplitude value is greater than a threshold.

Advantageously, the deformable and static portions are cylindrical.

According to another aspect, a boat propulsion nacelle includes a device for determining the direction and amplitude of a force on said nacelle, as defined above.

Figure 2:
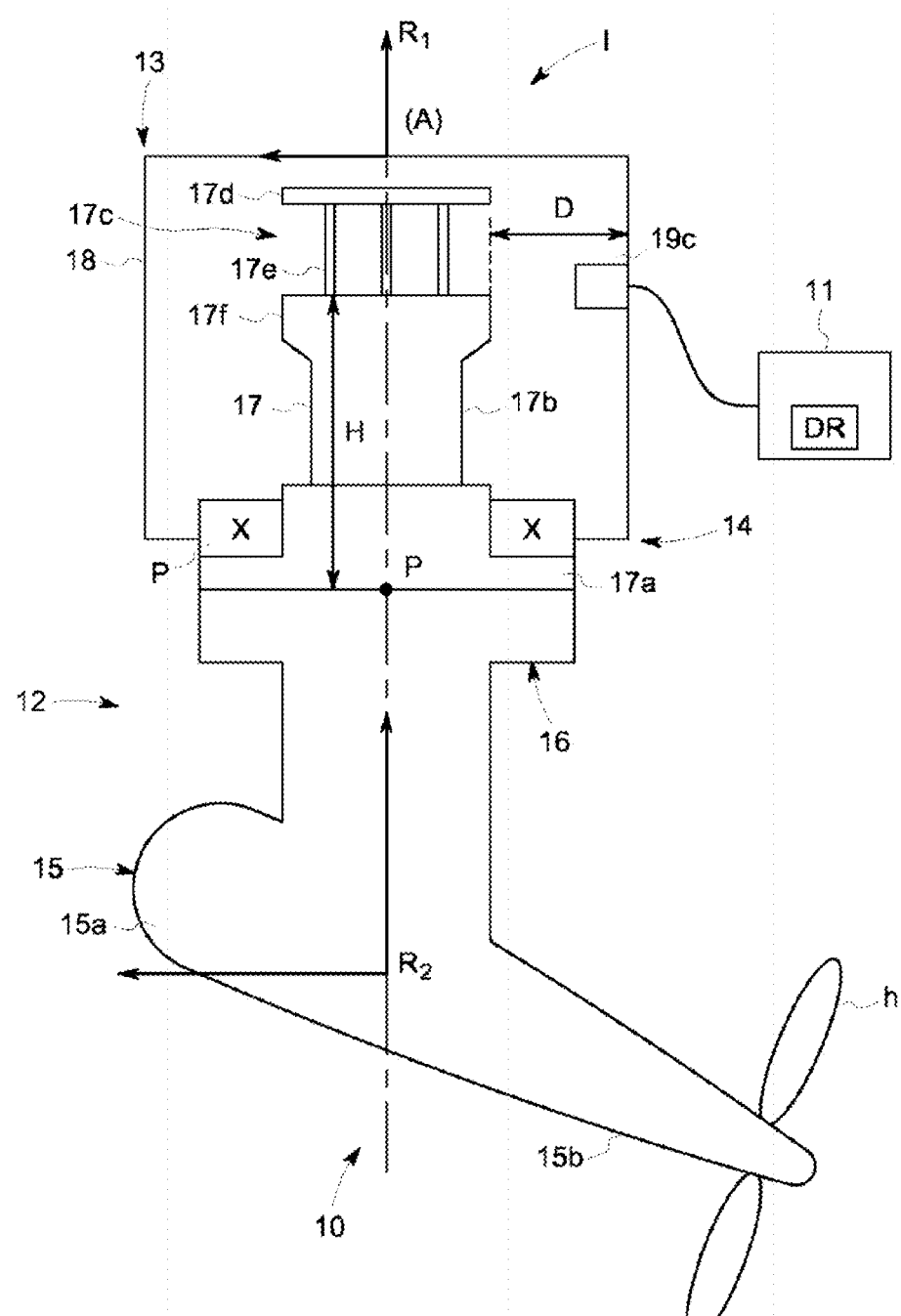
Figure 3:
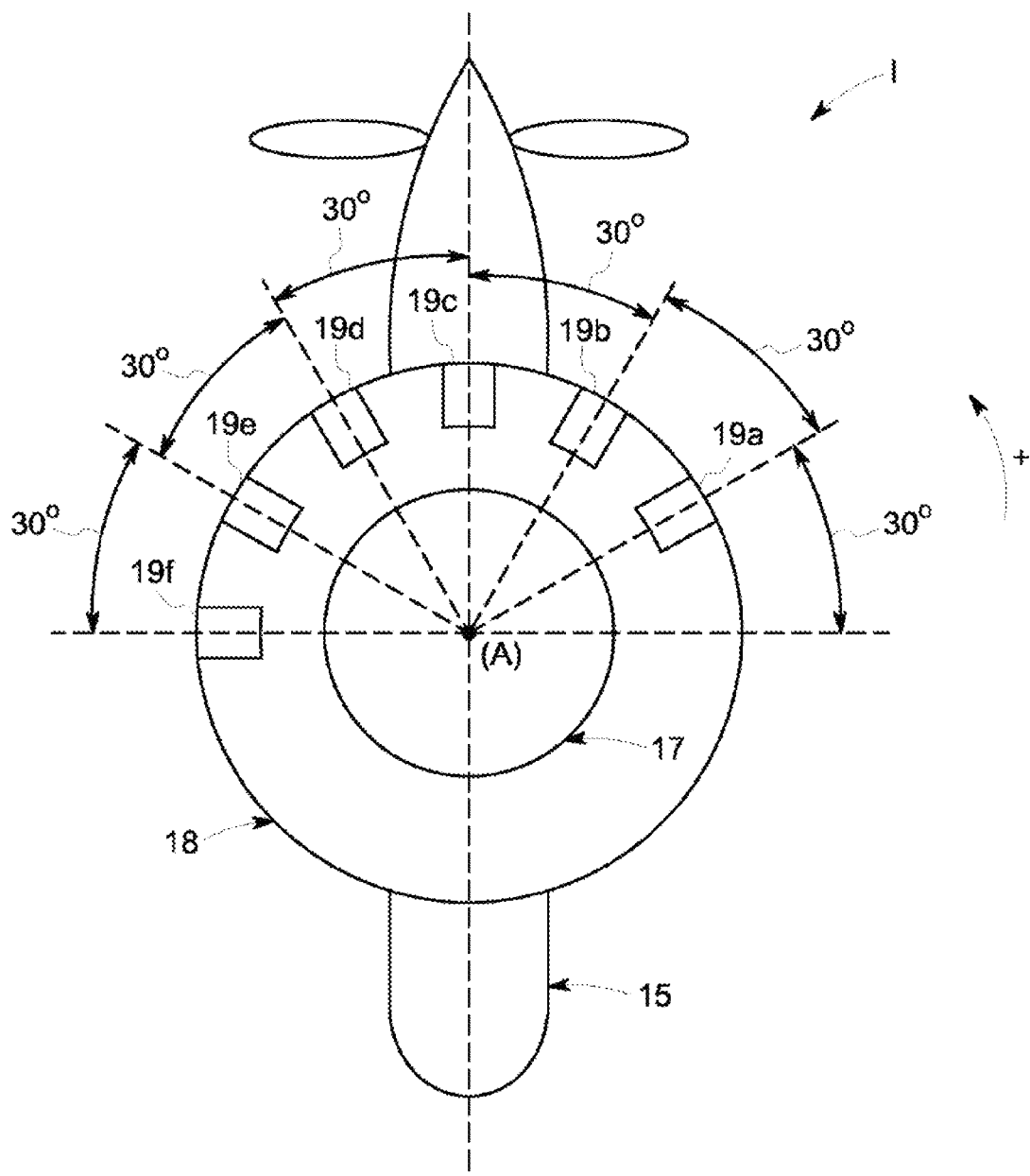
Figure 4:
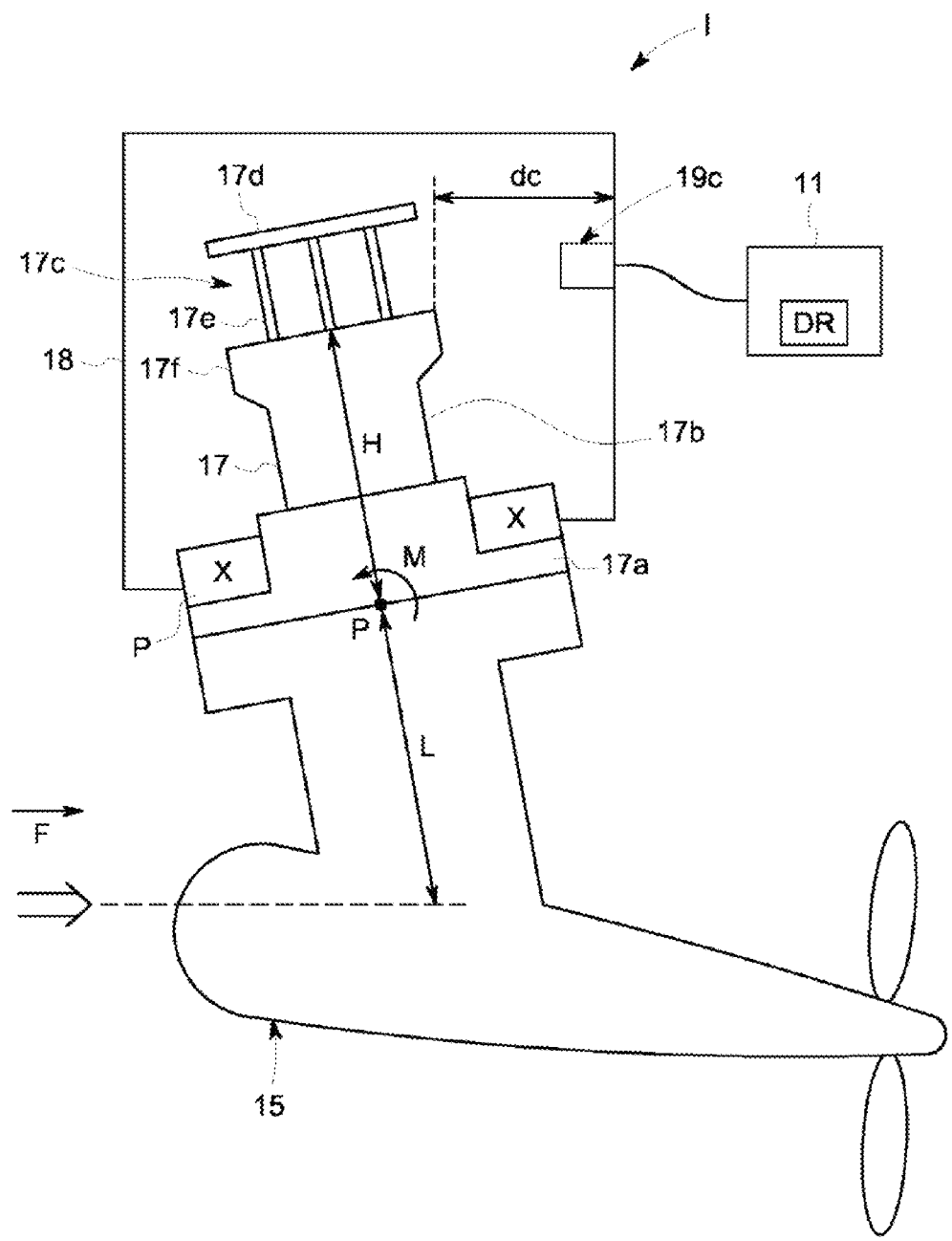
Figure 5:
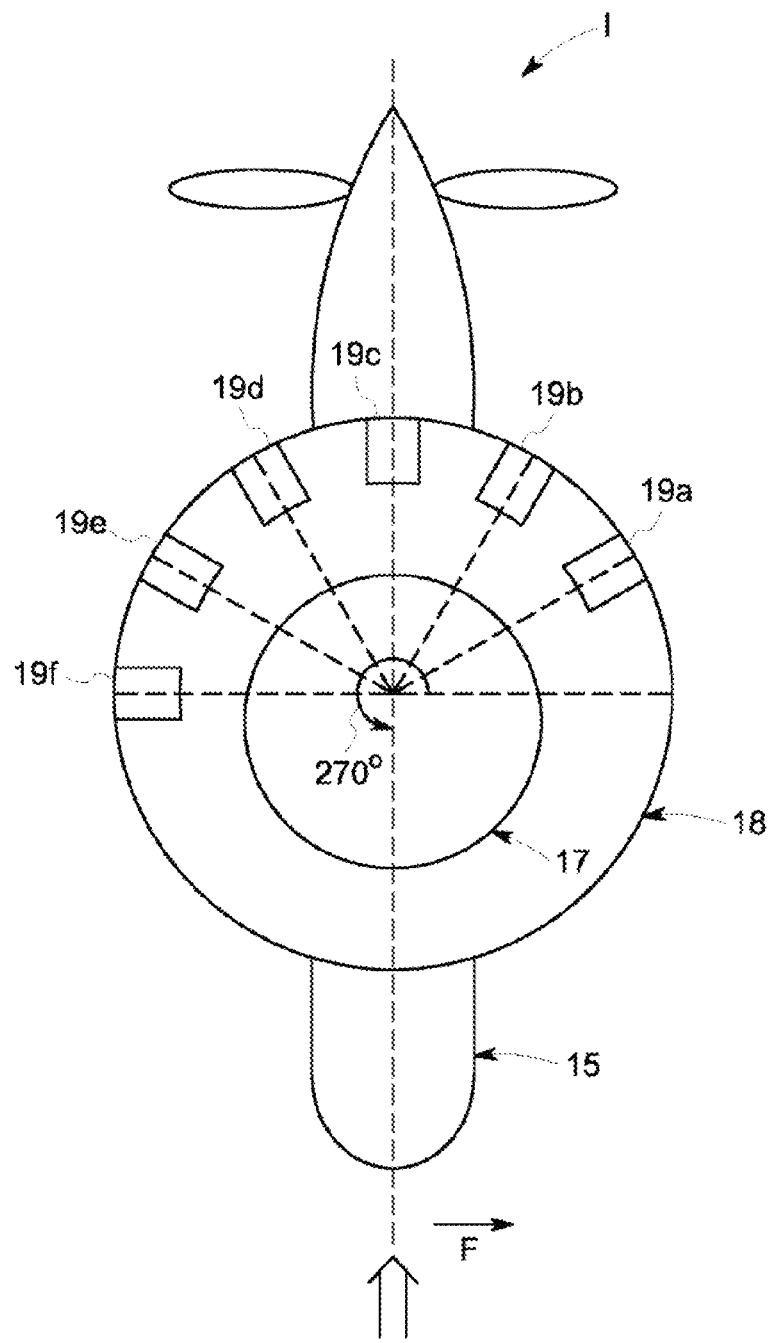
Figure 6:
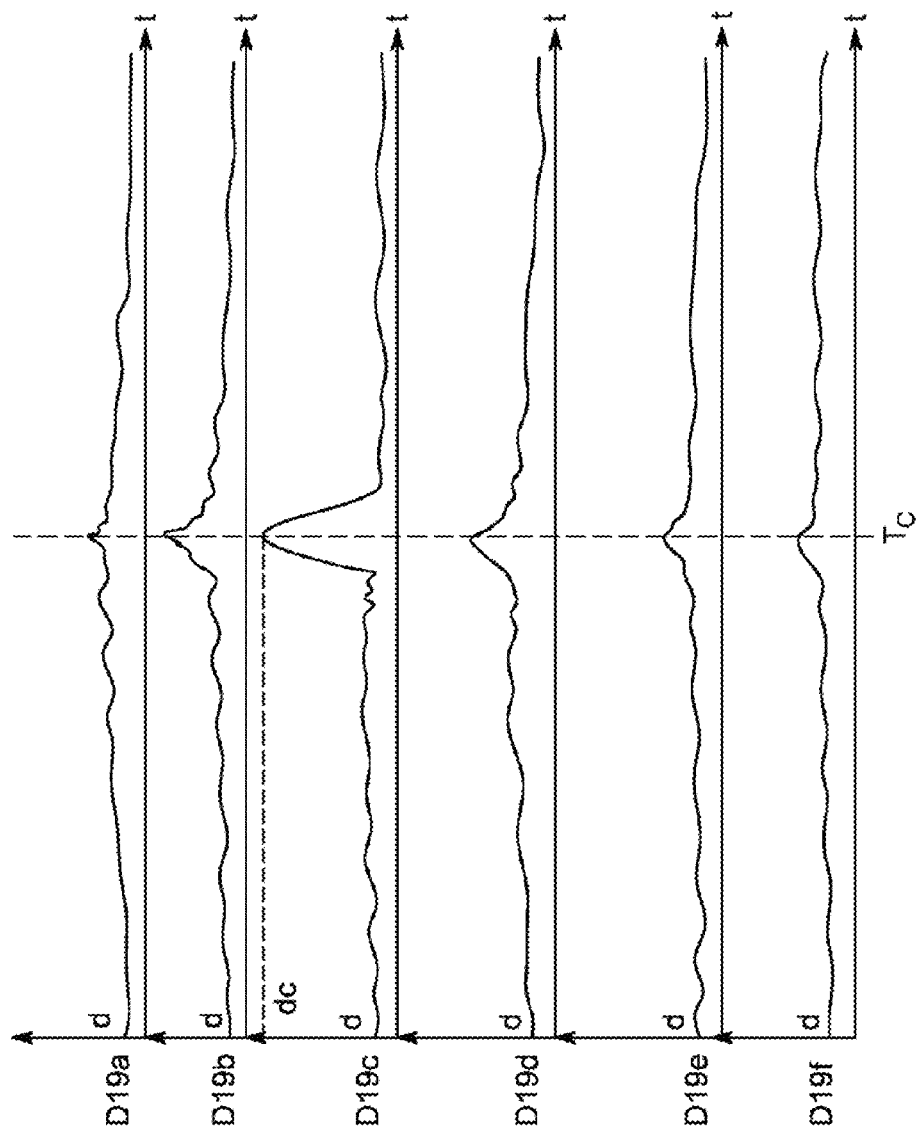
Figure 7:
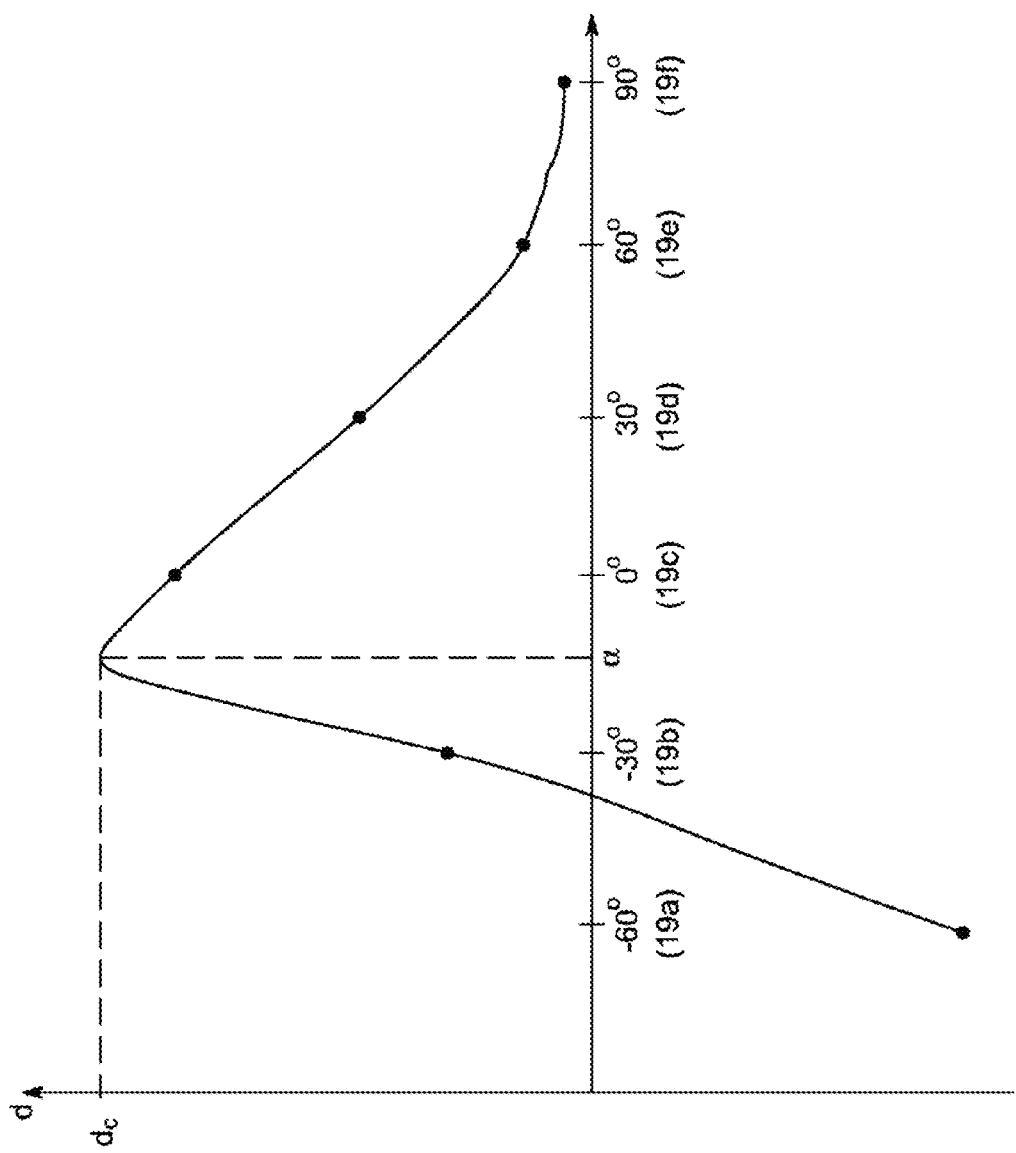

Other objectives, features and advantages of the invention are set out in the description below, given purely by way of non-limiting example and in reference to the attached drawings, in which:

FIG. 1, already mentioned, is a schematic representation of a boat hull fitted with a propulsion nacelle, FIGS. 2 and 3 are side and top views respectively of a propulsion nacelle fitted with an impact measurement device according to one embodiment of the invention, FIGS. 4 and 5 are side and top views of the propulsion nacelle in FIGS. 2 and 3 showing the behavior of the nacelle and the impact measurement device thereof in the event of an impact, FIG. 6 shows the values measured by the deformation sensors of the propulsion nacelle over time in the event of an impact, and FIG. 7 shows the values measured by the deformation sensors of the propulsion nacelle according to the angular position thereof in the event of an impact.

Reference is made to FIGS. 2 and 3, which show a boat propulsion nacelle 10 including a device I for determining the characteristics of the forces being applied to the nacelle when sailing the boat. This device is notably designed to determine the direction and amplitude of the forces applied to the nacelle.

As shown, the propulsion nacelle, which is mounted beneath the hull of the boat, has a movable portion 12 containing an electric motor that drives a propeller h and a static portion 13 that is fastened to the hull of the boat and connected to the movable portion 12 by means of a pivoting link 14. The movable portion 12 can be oriented in relation to the static portion 13 about an axis of rotation A perpendicular to the longitudinal axis of the boat, advantageously through an angle of revolution equal or close to 180°. A marker R1 is attached to the static portion 13 and a marker R2 is attached to the movable portion 12. The nacelle 10 is mounted by the static portion 13 beneath the hull of the boat such that the movable portion 12 extends outwards and is submerged to propel the boat. The impacts caused when sailing therefore affect the movable portion 12, and in particular essentially the front portion, in consideration of the direction of movement of the boat, and laterally.

The movable portion 12 has a moveable housing 15 with a front bulb 15a, a pointed rear portion 15b on which the propeller h is mounted and an intermediate fastening leg 16, the axis of which coincides with the axis of rotation A, fastening the movable portion 12 to the static portion 13 via the pivoting link 14. For this purpose, the pivoting link has a sealed bearing P that passes through the hull of the boat and is fastened to the static portion 13.

The static portion 13 has a cylindrical static housing 18 that is installed in the hull of the boat and that contains an air diffuser 17 channeling a cooling air flow to the electric motor carried inside the movable portion 12.

As shown in FIG. 2, the overall shape of the air diffuser 17 is cylindrical. The air diffuser comprises a base 17a that is rigidly connected to the fastening leg 16 arranged beneath an intermediate column 17b, which is in turn arranged beneath an open head 17c. The diffuser, including the base 17a and the intermediate column 17b, has an internal axial passage to channel the cooling air towards the motor. For this purpose, the base 17a has internal fins designed to channel the cooling air towards the motor.

The air diffuser 17 also guides the electrical power cables linked to the electric motor that is arranged inside the propulsion nacelle 10 and drives the propeller h.

For this purpose, the head 17c has a top platform 17d resting on feet 17e inside which the power cables are passed.

The intermediate portion 17b has a cylindrical end 17f opposite the base 17a of greater diameter.

The assembly comprising the base 17a arranged beneath the intermediate column 17b has a height H.

The device I for determining the characteristics of the forces being applied to the nacelle includes a member 19 for measuring the mechanical deformation of the nacelle. The member 19 is notably designed to measure the movement of the movable portion 12 in relation to the static portion 13 during mechanical deformation of the nacelle. The device I also includes a processing unit 11 that is designed to determine the amplitude and the direction of the forces using the measurements delivered by the measurement member 19.

The processing unit is for example based on a microprocessor. However, said unit may be any device able to determine the amplitude and the direction of the force using the measurements delivered by the measurement member 19. Said unit may notably be a microcontroller.

The measurement member 19 enables determination of a distance D between the cylindrical end 17f of the intermediate column 17b opposite the base 17a of the air diffuser 17 and the static housing 18 projected onto a plane perpendicular to the axis A.

The measurement member 19 includes a set of measurement sensors. In this example embodiment of the device, the measurement member 19 has six identical sensors 19a, 19b, 19c, 19d, 19e and 19f mounted on the static housing 18 and turned towards the diffuser 17. Said sensors are advantageously positioned to point towards the cylindrical surface 17f.

The sensors are mounted on a cylindrical portion of the static housing 18.

The measurement sensors are for example non-contact sensors made using ultrasound sensors. In a variant, these sensors can be made of optical sensors.

The measurement sensors are arranged to measure the distance D between the outer surface of the cylindrical surface of the end 17d of the intermediate column 17b of the air diffuser 17, at the end thereof opposite the moveable housing 15, and the static housing 18. In other words, each sensor 19a, 19b, 19c, 19d, 19e and 19f measures a distance between the end of the cylindrical surface 17d opposite the pivoting link 14 and the static portion 13 projected onto a plane perpendicular to the axis of rotation (A) of the deformable portion 12 in relation to the static portion 13.

The measurement sensors 19a, 19b, 19c, 19d, 19e and 19f are distributed angularly regularly in relation to the axis A over a half-perimeter of the static housing 18 turned towards the propeller, as shown in FIG. 3. The position of each measurement sensor is known and referenced. Since the air diffuser 17 and the static housing 18 are cylindrical, being moveable in rotation in relation to one another about an angular range of approximately 180°, only half of the perimeter of the housing need be fitted with deformation sensors to measure the movement of the diffuser 17 in relation to the static housing 18, regardless of the angular position thereof.

This reduces the number of measurement sensors required.

In the embodiment illustrated, the measurement member 19 has six measurement sensors 19a, 19b, 19c, 19d, 19e and 19f separated from one another by an angle of 30° in relation to the axis A.

Naturally, additional measurement sensors distributed regularly about the axis A can be added to increase the precision of the deformation measurements, or measurement sensors can be removed to simplify implementation of the device I.

The processing unit 11 processes the measurements delivered by the measurement sensors to provide an indication of the state of the propulsion nacelle in response.

Said unit is firstly programmed to determine the direction and amplitude of the force applied to the submerged movable portion 12 of the nacelle 10.

According to one embodiment of the device I, the direction and amplitude of the force are determined by selecting the measurement sensor delivering an extreme value.

Indeed, when the direction of the force applied to the movable wall of the nacelle is aligned with the direction indicated by one of the measurement sensors, i.e. is parallel to a radius passing through the axis A and one of the sensors, this sensor delivers an extreme value in relation to the other sensors.

The direction of the force is thus determined by the processing unit 11 by identifying the sensor supplying an extreme value.

If the force is applied at the same angle as the installation angle of the sensor, the value supplied by the sensor is minimal.

If the force is applied in a direction corresponding to the installation angle of the sensor increased by 180°, as shown in FIG. 4, the distance value measured is maximal.

The position of the selected sensor indicates the application direction of the force and the measured value makes it possible to determine the amplitude of the force, as explained below.

If the force is applied at an angle other than the angle of a measurement sensor, the processing unit 11 selects the two measurement sensors delivering the most extreme measured values.

The position of the selected sensors indicates the application direction of the force. The application point of the force is in this case between the two selected sensors, and the measured values make it possible to determine the amplitude of the force, as explained below.

According to another embodiment of the device I, the direction and amplitude of the force are determined by identifying an extremum of a curve C1 linking the values delivered by the sensors according to the angular position thereof in relation to the axis A at an instant T.

If no force is applied, the distance values measured by the measurement sensors are identical. The curve C1 is substantially a horizontal straight line that has no extremum.

If the force is applied at the same angle as the installation angle of a sensor, the curve C1 has an extremum that is a minimum.

If the force is applied in a direction corresponding to the installation angle of the sensor increased by 180°, as shown in FIG. 4, the curve C1 has an extremum that is a maximum.

The curve C1 links the value of the extremum to the angular position of application of the force in the marker R1.

The processing unit 11 samples the values of the measurement sensors at each instant T, determines the curve C1, identifies the extremum and infers the application direction of the force therefrom.

The sampling period T is for example 5 ms.

The value of the extremum makes it possible to determine the amplitude of the force, as explained below.

If the nacelle 10 suffers no impact, the value of the distance D is equal to a predetermined value d, for each measurement sensor.

The amplitude of the force applied to the deformable portion 12 is determined using data stored in a memory of the processing unit 11 in the form of a correlation between the amplitude of the applied force and the value measured by each measurement sensor. This correlation is a response curve DR (FIG. 2) that links the value of a force as a function of the value measured by each measurement sensor.

The response curve DR can take any form, notably linear, polynomial or parabolic.

In order to clarify determination of the response curve DR, it is assumed below that the response curve DR is linear.

This straight line DR is established by plotting a distance value measured by the measurement sensor when a force of known value is applied to the deformable portion 12.

The known and measured values each form a point on the straight line DR defined by a distance/force value pairing. At least two value pairings are required to determine a straight response line.

The first value pairing is determined with no force applied to the deformable portion 12. This produces the distance value d.

The second value pairing is determined by applying a force of known amplitude at the same angle as a measurement sensor to the deformable portion 12.

These two value pairings make it possible to determine a linear equation for the straight response line DR.

A person skilled in the art could adapt the number of value pairings required as a function of the shape of the curve.

Since the measurement sensors are identical, arranged on the half-perimeter of the cylindrical housing 18, and since the diffuser 17 is cylindrical, the straight line DR is identical for all of the measurement sensors.

These value pairings are for example determined using a model and a calculation using the known finite elements method or using force and movement measurements taken on the propulsion nacelle 10 mounted on a test bench.

The processing unit 11 associates each value measured by a measurement sensor with an amplitude of the force by extrapolating the response curve DR.

The processing unit selects the measurement sensor returning the extreme value in relation to the other values measured by the other sensors and calculates the amplitude of the applied force using the value supplied by the selected measurement sensor and the response curve DR.

If two sensors return an extreme value in relation to the values measured by the other sensors, the two values being identical within tolerance, the processing unit 11 calculates the amplitude of the applied force by averaging the two amplitudes determined using the values measured by the two sensors and the response curve DR.

Naturally, the precision of the determination of the amplitude of a force can be improved by plotting a straight response line DR quadratically using more than two value pairings.

Reference is made to FIGS. 4 and 5, which show the device I when the nacelle is subjected to a force $\vec{F}$ at an instance Tc. The force $\vec{F}$ is in this case oriented at 270° counter-clockwise in relation to the axis (A) and of amplitude F. The force $\vec{F}$ is applied at the same angle as the measurement sensor 19c increased by 180° about the axis (A). The force $\vec{F}$ is applied to a point of impact located at a distance L from the end of the air diffuser 17 in contact with the fastening leg 16.

Under the impact of the force $\vec{F}$, the movable portion of the propulsion nacelle 10 is deformed in relation to the static portion. Since the movable portion 12 and the static portion 13 are rigidly connected together in the direction of the impact, the force $\vec{F}$ exerts a torsional moment M on the fastening leg 16 at the point P of the axis of rotation (A), between the movable portion and the static portion, the value of which is F*L. The fastening leg 16 is deformed under the effect of the moment M. Increasing the distance L amplifies the deformation of the fastening leg 16. The housing 15 therefore amplifies the effects of a force applied to the deformable portion 12 along the length L.

Since the diffuser 17 is rigidly connected to the fastening leg 16, which is deformed in the direction of the impact, said diffuser moves in the direction opposite the impact $\vec{F}$, such that the point P forms a pivot for the deformable portion subjected to a force. The amplitude of the movement of the diffuser 17 is amplified as a function of the height H thereof, as explained above.

The measurement sensors 19a, 19b, 19c, 19d, 19e and 19f measure the movement amplified by the height H of the diffuser 17.

FIG. 6 shows the trend of the distances measured by the six measurement sensors 19a, 19b, 19c, 19d, 19e and 19f as a function of time t. If there is no impact, the distances D19a, D19b, D19c, D19d, D19e and D19f measured by the seven sensors are all equal to d.

At the instant Tc of impact, the value of the distance D19c measured by the sensor 19d, which coincides with the direction of the force applied to the nacelle, has a peak amplitude dc.

The sensors 19a, 19b, 19d, 19e and 19f measure different distances, in this case lesser distances.

FIG. 7 shows the trend of the distances measured by the six measurement sensors 19a, 19b, 19c, 19d, 19e and 19f as a function of the respective angular position thereof at the instant Tc of impact. The measurement sensor 19c is at the angular position 0° when the moveable housing 15 is in at-sea operating state, i.e. when the movable portion 12 is aligned with the static portion 13, as shown in FIG. 3.

The curve C1 has a maximum amplitude dc measured at the angular position α in relation to the axis (A) positioned between the sensors 19b and 19c.

The processing unit 11 uses the values measured by the measurement sensors 19 and the response curve DR determined above, as a function of the peak amplitudes measured, to filter and determine the torsional moment M, the amplitude of the impact, the direction of the impact in the marker R1, then projects the direction of the impact in the marker R2.

Depending on the orientation of the propulsion nacelle 10, the markers R1 and R2 are not coincident.

The amplitude and direction values of the impact in the marker of the boat and of the propulsion nacelle are saved in a memory by the processing unit 11 as a function of time.

According to another embodiment, the processing unit 11 only saves the characteristics of an impact if the amplitude value of the impact is greater than a predetermined value. In other words, the direction value of the impact and the corresponding amplitude value are only saved if the amplitude value is greater than a threshold. This selective saving of the characteristics of an impact makes it possible to quickly analyze the impacts that damage the nacelle 10 to decide when to carry out maintenance operations.

The processing unit 11 has a screen for displaying the amplitude and direction values of the impact in real time, as well as the saved values.

The saved values make it possible to create a log of impacts and therefore to plan preventive maintenance periods for the propulsion nacelle 10, for example by comparing the measured and calculated characteristics with threshold values.

Advantageously, the embodiment of the method described determines the direction and amplitude of the impact in a simple manner, requiring few sensors and a single calibration step for the measurement member.

This embodiment can be easily transposed to study a force applied to the nacelle in a non-permanent manner. The processing unit and the measurement member merely require sufficient resolution to detect a variation in amplitude when applying a force to the nacelle.

The invention claimed is:

1. A method for determining the direction and amplitude of a force applied to a system including a static portion comprising a static housing (i) comprising a cylindrical air diffuser being movable in rotation in relation to the static housing and (ii) being connected by a pivoting link to a movable portion deformable under the effect of said force, the cylindrical air diffuser being configured to channel a cooling air flow to the movable portion, the static portion comprising a set of measurement sensors placed inside the static housing and being angularly and regularly distributed in relation to an axis positioned over a half-perimeter of the static housing, measuring a movement of the movable portion in relation to the static portion and processors processing the measurements from the sensors,
    using the measurement sensors to measure a distance between an end of the cylindrical air diffuser opposite the pivoting link, and the static portion to determine the mechanical deformations being applied to the movable portion under the effect of said force, and
    using the processors to process the distance measurements to determine the amplitude and direction of the force.

2. The method of claim 1, wherein the direction of the force is determined from the position of at least one measurement sensor delivering a maximum measurement value in relation to the measurement values supplied respectively by the set of angularly distributed measurement sensors.

3. The method of claim 1, wherein the amplitude of the force is determined from a set of distance measurements predetermined as a function of force values.

4. The method of claim 3, wherein the set of distance measurements vary linearly as a function of the force values.

5. The method of claim 3, further comprising a calculation step using a finite element method.

6. The method of claim 3, further comprising a force measurement and movement step carried out on a test bench.

7. A system having the functionality to determine the direction and amplitude of a force applied to the system, the system comprising,
    a static portion comprising a static housing (i) comprising a cylindrical air diffuser being movable in rotation in relation to the static housing and (ii) being connected by a pivoting link to a movable portion deformable under the effect of said force, the cylindrical air diffuser being configured to channel a cooling air flow to the movable portion;
    a set of measurement sensors placed inside the static housing, the set of measurement sensors being (i) angularly and regularly distributed in relation to an axis positioned over a half-perimeter of the static housing and (i configured to measure a distance between an end of the cylindrical air diffuser opposite the pivoting link, and the static portion; and
    processors configured to processing the measurements from the sensors to determine the amplitude and direction of the force.

8. The system of claim 7, further comprising measurement sensors mounted on the movable portion.

9. The system of claim 7, wherein at least some of the measurement sensors are mounted on the half-perimeter of the static housing turned towards a propeller of the system, the propeller being linked to the moveable portion via a rotary shaft and an orientation device.

10. The system of claim 7, wherein the processors are designed to determine the direction of the force from the position of at least one measurement sensor delivering a maximum measurement value in relation to the measurement values supplied by the other measurement sensors.

11. The system of claim 7, wherein the processors include a storage to store a set of distance measurement values predetermined as a function of force values, the processors being designed to determine the amplitude of the force using the measurements delivered by the measurement sensors.

12. The system of claim 11, wherein the storage only saves the direction and amplitude values of a force if the amplitude value is greater than a threshold.

13. The system of claim 7, wherein the movable portion and the static portion are cylindrical.

14. A boat propulsion nacelle system having the functionality to determine the direction and amplitude of a force applied to the nacelle system, the nacelle system comprising,
a static portion comprising a static housing (i) comprising a cylindrical air diffuser being movable in rotation in relation to the static housing and (ii) being connected by a pivoting link to a movable portion deformable under the effect of said force, the cylindrical air diffuser being configured to channel a cooling air flow to the movable portion;
a set of measurement sensors placed inside the static housing, the set of measurement sensors being (i) angularly and regularly distributed in relation to an axis positioned over a half-perimeter of the static housing and (ii) configured to measure a distance between an end of the cylindrical air diffuser opposite the pivoting link, and the static portion; and
processors configured to processing the measurements from the sensors.

15. The nacelle system of claim 14, further comprising measurement sensors mounted on the movable portion.

16. The nacelle system of claim 14, wherein at least some of the measurement sensors are mounted on the half-perimeter of the static housing turned towards a propeller of the boat propulsion nacelle system.

17. The nacelle system of claim 14, wherein the processors are designed to determine the direction of the force from the position of at least one measurement sensor delivering a maximum measurement value in relation to the measurement values supplied by the other measurement sensors.

18. The nacelle system of claim 14, wherein the processors include a storage to store a set of distance measurement values predetermined as a function of force values, the processors being designed to determine the amplitude of the force using the measurements delivered by the measurement sensors.

19. The nacelle system of claim 18, wherein the storage only saves the direction and amplitude values of a force if the amplitude value is greater than a threshold.

20. The nacelle system of claim 14, wherein the movable portion and the static portion are cylindrical.

* * * * *